(12) United States Patent
Miyahara et al.

(10) Patent No.: US 8,111,423 B2
(45) Date of Patent: Feb. 7, 2012

(54) IMAGE PROCESSING DEVICE AND IMAGE PROCESSING METHOD

(75) Inventors: Seiji Miyahara, Chiba (JP); Hiroaki Suzuki, Chiba (JP); Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 785 days.

(21) Appl. No.: 12/236,057

(22) Filed: Sep. 23, 2008

(65) Prior Publication Data

US 2009/0122372 A1    May 14, 2009

(30) Foreign Application Priority Data

Nov. 13, 2007  (JP) ................................ 2007-294583

(51) Int. Cl.
*H04N 1/04* (2006.01)

(52) U.S. Cl. .......... 358/1.9; 358/518; 358/523; 358/525

(58) Field of Classification Search .................. 358/1.9, 358/518, 523, 525
See application file for complete search history.

(56) References Cited

U.S. PATENT DOCUMENTS

| | | | |
|---|---|---|---|
| 5,689,590 A | 11/1997 | Shirasawa et al. | |
| 5,805,213 A * | 9/1998 | Spaulding et al. | 348/222.1 |
| 5,831,751 A | 11/1998 | Ohneda et al. | |
| 6,005,970 A | 12/1999 | Ohneda et al. | |
| 6,137,595 A | 10/2000 | Sakuyama et al. | |
| 6,222,932 B1 * | 4/2001 | Rao et al. | 382/100 |
| 6,226,011 B1 | 5/2001 | Sakuyama et al. | |
| 6,839,460 B2 | 1/2005 | Shirasawa | |
| 7,003,176 B1 | 2/2006 | Suzuki et al. | |
| 7,072,084 B2 | 7/2006 | Shirasawa | |
| 7,310,167 B2 | 12/2007 | Shirasawa | |
| 7,362,896 B2 | 4/2008 | Shirasawa | |
| 2004/0126009 A1 | 7/2004 | Takenaka et al. | |
| 2005/0008258 A1 | 1/2005 | Suzuki et al. | |
| 2005/0237544 A1 | 10/2005 | Suzuki et al. | |
| 2006/0192878 A1 | 8/2006 | Miyahara et al. | |
| 2007/0013927 A1 | 1/2007 | Miyahara et al. | |
| 2008/0007806 A1 | 1/2008 | Shirasawa | |
| 2008/0174798 A1 * | 7/2008 | Cho et al. | 358/1.9 |

FOREIGN PATENT DOCUMENTS

| | | |
|---|---|---|
| JP | 2002-152536 | 5/2002 |
| JP | 3337697 | 8/2002 |
| JP | 2004-104777 | 4/2004 |
| JP | 4137393 | 6/2008 |

OTHER PUBLICATIONS

U.S. Appl. No. 07/572,135, filed Aug. 22, 1990.
U.S. Appl. No. 08/052,918, filed Apr. 27, 1993 (now abandoned).

* cited by examiner

*Primary Examiner* — Houshang Safaipour
(74) *Attorney, Agent, or Firm* — Cooper & Dunham LLP (57) ABSTRACT

A converting unit converts a first color signal into a second color signal and a third color signal. A first correcting unit corrects a magnitude relation between hue angles of the third color signal such that a magnitude relation between hue angles of the second color signal corresponding to the first color signal is maintained in the hue angles of the third color signal. The first color signal is a device-dependent input red, green, blue color signal. The second color signal is a color signal of a hue, lightness, saturation color space. The third color signal is a color signal of CIECAM02 color space.

8 Claims, 9 Drawing Sheets

|   | h |   |   |   |   |
|---|---|---|---|---|---|
|   |   | 0 | 1 | 2 | ... | 359 |
| J | 0 | 0.0 | 0.0 | 0.0 | 0.0 | 0.0 |
|   | 1 | 0.0 | 0.0 | 0.0 | 0.0 | 0.0 |
|   | ... | 0.0 | 0.0 | 0.0 | 0.0 | 0.0 |
|   | 10 | 0.0 | 0.0 | 0.0 | 0.0 | 0.0 |
|   | 11 | 2.5 | 2.7 | 1.5 | 0.5 | 2.3 |
|   | ... | ... | ... | ... | ... | ... |
|   | 100 | 0.0 | 0.0 | 0.0 | 0.0 | 0.0 |

|    | J    | aC   | bC   |
|----|------|------|------|
| WP | 92.5 | −0.5 | −1.5 |
| BP | 10.5 | 0.0  | −1.1 |

| H | S | L | deg. |
|---|---|---|---|
| 0.0 | 0.0 | 0.0 | 0.0 |
| 0.0 | 0.0 | 0.5 | 0.0 |
| 0.0 | 0.0 | 1.0 | 0.0 |
| 0.0 | 0.5 | 0.0 | 0.0 |
| 0.0 | 0.5 | 0.5 | −5.0 |
| 0.0 | 0.5 | 1.0 | 0.0 |
| 0.0 | 1.0 | 0.0 | 0.0 |
| 0.0 | 1.0 | 0.5 | −2.0 |
| 0.0 | 1.0 | 1.0 | 0.0 |
| 30.0 | 0.0 | 0.0 | 0.0 |
| 30.0 | 0.0 | 0.5 | 0.0 |
| 30.0 | 0.0 | 1.0 | 0.0 |
| 30.0 | 0.5 | 0.0 | 0.0 |
| 30.0 | 0.5 | 0.5 | 4.0 |
| 30.0 | 0.5 | 1.0 | 0.0 |
| 30.0 | 1.0 | 0.0 | 0.0 |
| 30.0 | 1.0 | 0.5 | 3.5 |
| 30.0 | 1.0 | 1.0 | 0.0 |
| ... | ... | ... | ... |
| 330.0 | 1.0 | 0.0 | 0.0 |
| 330.0 | 1.0 | 0.5 | −4.5 |
| 330.0 | 1.0 | 1.0 | 0.0 |

FIG. 14
EXPRESSION (1)

$RGB \Rightarrow HLS$
$MAX = max(R, G, B)$
$MIN = min(R, G, B)$
$L = (MAX + MIN)/2$

WHEN MAX IS EQUAL TO MIN
$S = 0$
$H = 0$

WHEN MAX IS NOT EQUAL TO MIN $$S = \begin{cases} (MAX - MIN)/(MAX + MIN) & L \le 0.5 \\ (MAX - MIN)/(2 - MAX - MIN) & L > 0.5 \end{cases}$$

$Cr = (MAX - R)/(MAX - MIN)$
$Cg = (MAX - G)/(MAX - MIN)$
$Cb = (MAX - B)/(MAX - MIN)$ $$H = \begin{cases} Cb - Cg & R = MAX \\ 2 + Cr - Cb & G = MAX \\ 4 + Cg - Cr & B = MAX \end{cases}$$

$H = 60 \times H$
$H = H + 360 \quad H < 0$

---

$HLS \Rightarrow RGB$ $$MAX = \begin{cases} L \times (1+S) & L \le 0.5 \\ L \times (1-S) + S & L > 0.5 \end{cases}$$

$MIN = 2 \times L - MAX$

WHEN S IS EQUAL TO ZERO
$R = G = B = L$

WHEN S IS NOT EQUAL TO ZERO
$h = H + 120$
$h = h - 360 \quad h \ge 360$ $$R = \begin{cases} MIN + (MAX - MIN) \times h/60 & 0 \le h < 60 \\ MAX & 60 \le h < 180 \\ MIN + (MAX - MIN) \times (240 - h)/60 & 180 \le h < 240 \\ MIN & 240 \le h < 360 \end{cases}$$

$h = H$ $$G = \begin{cases} MIN + (MAX - MIN) \times h/60 & 0 \le h < 60 \\ MAX & 60 \le h < 180 \\ MIN + (MAX - MIN) \times (240 - h)/60 & 180 \le h < 240 \\ MIN & 240 \le h < 360 \end{cases}$$

$h = H - 120$
$h = h + 360 \quad h < 0$ $$B = \begin{cases} MIN + (MAX - MIN) \times h/60 & 0 \le h < 60 \\ MAX & 60 \le h < 180 \\ MIN + (MAX - MIN) \times (240 - h)/60 & 180 \le h < 240 \\ MIN & 240 \le h < 360 \end{cases}$$

IMAGE PROCESSING DEVICE AND IMAGE PROCESSING METHOD

CROSS-REFERENCE TO RELATED APPLICATIONS

The present application claims priority to and incorporates by reference the entire contents of Japanese priority document 2007-294583 filed in Japan on Nov. 13, 2007.

BACKGROUND OF THE INVENTION

1. Field of the Invention

The present invention relates to an image processing device and an image processing method with a capability of perceptually reproducing an image in an equal hue, and further relates to a technique suitable for color converting devices such as a display, a scanner, a digital camera, a color printer, a color facsimile, a color hard copier and software used in the color printer that runs on a personal computer (PC) or a workstation.

2. Description of the Related Art

Generally, display devices such as a cathode ray tube (CRT) and a liquid crystal display (LCD) and a printing device such as a printer are widely used as devices for outputting color images. However, due to different output method of respective display device and the printing device, discrepancies occur in a reproducible color range. If the same image data is output by using different output devices, for example, if an image created on the LCD is to be printed using the printer, colors that cannot be reproduced are likely to be produced. Thus, while handling the color images on a plurality of devices, a technique, in other words, a color conversion process that is called a gamut processing needs to be carried out for mapping color image signals to a color reproducible by the output devices.

As disclosed in Japanese Patent Application Laid-open No. 2004-104777, in the existing gamut processing technique, while converting a first color signal of a device-independent color space into a second color signal of a device-independent color space belonging to a color gamut of a second device, the color gamut mapping is carried out by using a corrected device-independent color space. The corrected device-independent color space is corrected from a curved surface, of the equal hue, including an achromatic axis in the device-independent color space or a curved surface conforming to the equal hue to a half plane including the achromatic axis and then mapped.

As disclosed in Japanese Patent Application Laid-open No. 2002-152536, the color signals are converted into a first intermediate color signal of the device-independent color space in which hue distortion on an input side color space is removed. With respect to the first intermediate color signal, gamut mapping is carried out by hue correction, lightness compression, and color saturation compression and the first intermediate color signal is converted into a second intermediate color signal. The second intermediate color signal is converted into an output side color space such that equal hues in the device-independent color space become linear in the output side color space.

Furthermore, as disclosed in Japanese Patent No. 3337697, based on the color saturation, a non-linear line that causes the hue in a uniform perceptual color space to change is prepared for a plurality of different hues in the uniform perceptual color space. Furthermore, by using the non-linear line corresponding to the hue in the uniform perceptual color space, an input color data is converted within a color reproducing range of a color image output device.

As disclosed in Japanese Patent Application Laid-open No. 2002-262120, a maximally saturated color in the hue that is matched with an input color signal Pi is calculated as a standard color signal T and by referring to a gamut data of the output device, a corresponding color signal M that corresponds to the standard color signal T, and that is having a minimum color difference within the color reproducing range of the output device is calculated. An output hue deciding unit decides, based, on the corresponding color signal M, a hue h of an output color signal Po and a mapping processor calculates lightness and saturation components. The lightness and saturation components are output as the output color signal Po, thus reducing color change at the time of mapping.

If a device-dependent color space is assumed as a standard red, green, blue (sRGB), the device-independent color space is assumed as color signals of a color appearance model international commission on illumination color appearance model 2002 (CIECAM02) (for CIECAM02, see a technical report CIE 159:2004 of CIE), and input RGB color signals are converted into the color signals of CIECAM02, a magnitude relation between hue angles becomes reverse.

Figure 11:
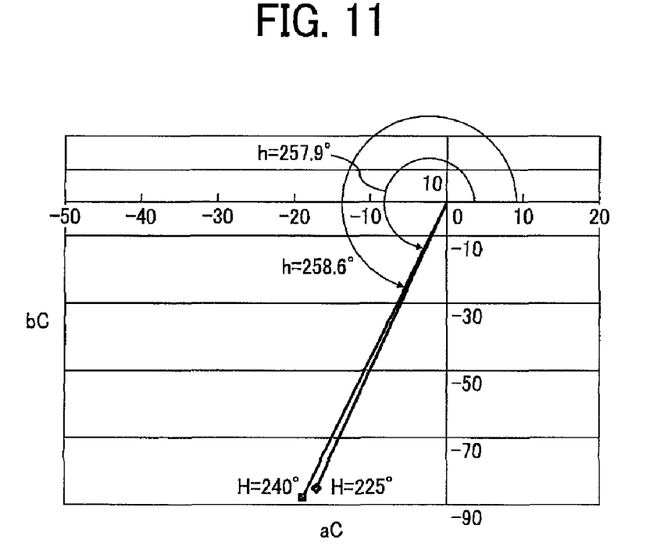
FIG. 11 is a schematic diagram for explaining a problem indicating that a magnitude relation between hue angles becomes reverse.

In other words, as shown in FIG. 11, RGB values on two outermost contours of an sRGB color space are (R, G, B)=(0, 64, 255) and (R, G, B)=(0, 0, 255). In a hue, lightness, saturation (HLS) space, (R, G, B)=(0, 64, 255) corresponds to (H, L, S)=(225, 0.5, 1.0) and (R, G, B)=(0, 0, 255) corresponds to (H, L, S)=(240, 0.5, 1.0). In other words, in the HLS color space, although hue angles H are respectively H1=225 degrees, and H2=240 degrees (H1 is less than H2), if the HLS color space is converted into the color space of CIECAM02, a hue angle h corresponding to the hue angle H1=225 degrees approximately becomes h1=258.6 degrees and the hue angle h corresponding to the hue angle H2=240 degrees approximately becomes h2=257.9 degrees (h1 is greater than h2). The magnitude relation between the hue angles becomes reverse.

As indicated in expression (1) that is shown in FIG. 14, the HLS is a space that can be mutually converted with RGB in a linear shape. The HLS is a color space in which the RGB space is indicated by H (hue), L (lightness), and S (saturation).

Figure 12:
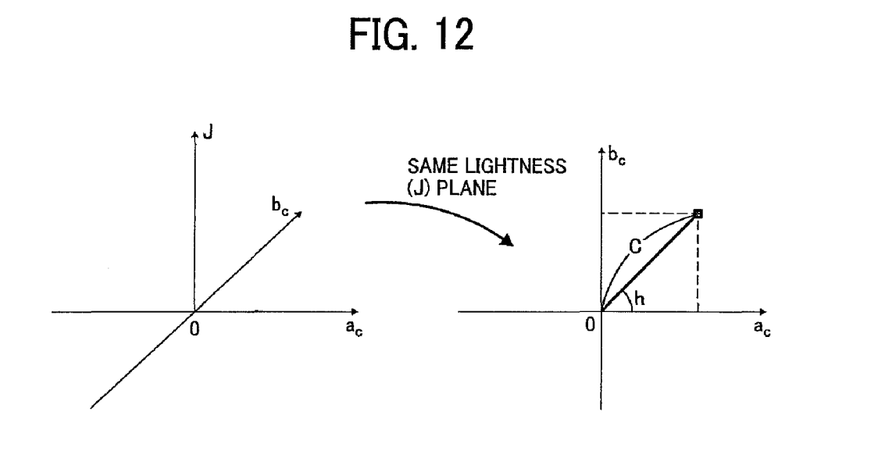
FIG. 12 is a schematic diagram for explaining a color space (a relation between $Ja_cb_c$ and JCh) of CIECAM02.

Among $ja_cb_c$ color signals of CIECAM02, a horizontal axis and a vertical axis shown in FIG. 11 are respectively indicated by $a_c$ and $b_c$ that indicate chromaticity. As shown in FIG. 12, JCh color signals that indicate the color space of CIECAM02 by lightness, saturation, and a hue angle only differ with respect to whether the JCh color signals are in an orthogonal coordinate system or a cylindrical coordinate system. The hue angles h of some color signals are angles that are in a counterclockwise direction between the $a_c$ axis plus direction and some color signals. The plus direction of the $a_c$ axis is assumed as 0 degrees.

Thus, the magnitude relation between the hue angles becomes reverse when the device-dependent sRGB color signals are converted into the color signals of CIECAM02. However, reversing of the magnitude relation between the hue angles is not taken into consideration in Japanese Patent Application Laid-open No. 2004-104777. Thus, if the color is reproduced by the second device after color gamut mapping, the color is reproduced even though the magnitude relation between the hue angles is in a reverse state. Furthermore, the mapping is carried out by using the corrected device-independent color space that is corrected from the curved surface, of equal hues, including the achromatic axis in the device-independent color space or the curved surface conforming to the equal hues to the half plane including the achromatic axis and mapped. However, the color of the achromatic axis of the device-dependent color space changes (the achromatic axis of sRGB and the achromatic axis of $Ja_cb_c$ space do not completely match).

Similarly, in Japanese Patent Application Laid-open No. 2002-152536 and Japanese Patent No. 3337697, reversing of the magnitude relation between the hue angles while converting the device-dependent color signals on the input side into the color signals of the device-independent color space is not taken into consideration.

Figure 13:
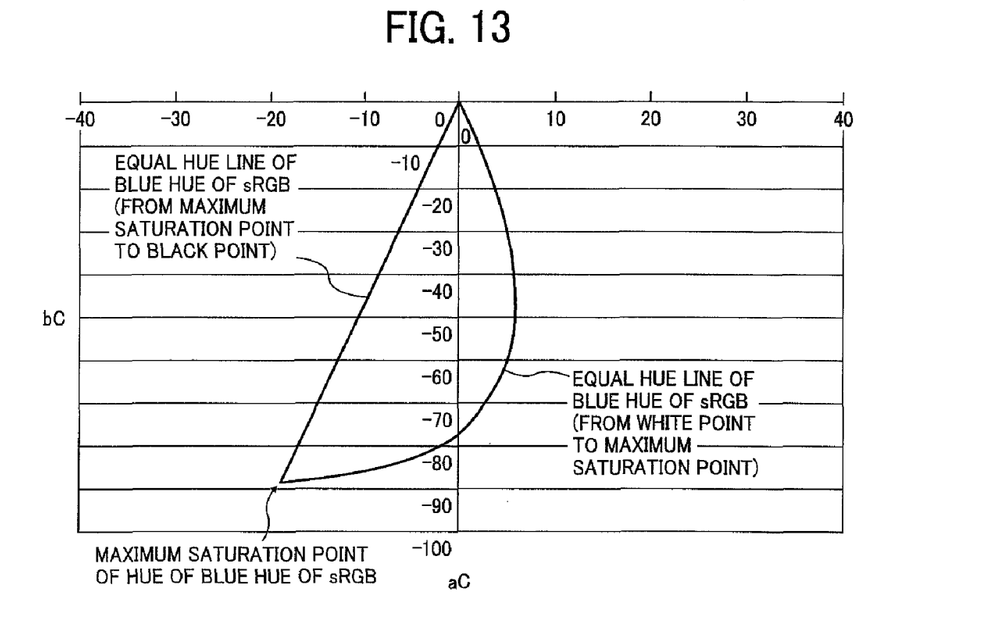
FIG. 13 is a schematic diagram for explaining a hue curve of blue hue (H=225 degrees) of sRGB in the color space of CIECAM02.

As disclosed in Japanese Patent Application Laid-open No. 2002-262120, the color gamut mapping can be carried out such that the color change is not prominently visible and input signals of the same hue always become output signals of the same hue. However, as shown in FIG. 13, based on the color space of the input signals, from a maximum saturation point of blue hue, the hue significantly approaches towards purple color on a white point side. If the color is reproduced without changing the hue of the input color signals, although the color reproduced is loyal to the hue of the input signals, isochromaticity is deteriorated (FIG. 13 is a schematic diagram in which the blue hue (from the white point to the maximum saturation of blue and further to a black point) of sRGB is converted into a $Ja_cb_c$ value of CIECAM02 and is plotted in an $a_cb_c$ plane. An equal hue line in the sRGB color space from the white point to a maximum saturation point is significantly curved on the plus direction of $a_c$.

SUMMARY OF THE INVENTION

It is an object of the present invention to at least partially solve the problems in the conventional technology.

According to one aspect of the present invention, there is provided an image processing device including a converting unit that converts a first color signal into a second color signal and a third color signal and a first correcting unit that corrects a magnitude relation between hue angles of the third color signal such that a magnitude relation between hue angles of the second color signal corresponding to the first color signal is maintained in the hue angles of the third color signal. The first color signal is a device-dependent input red, green, blue color signal. The second color signal is a color signal of a hue, lightness, saturation color space. The third color signal is a color signal of CIECAM02 color space.

Furthermore, according to another aspect of the present invention, there is provided an image processing device including a converting unit that converts a first color signal into a second color signal and a third color signal; a table unit that stores therein a parameter for correcting a hue curve of the second color signal corresponding to the first color signal and correcting a magnitude relation between hue angles of the third color signal; and a correcting unit that performs a hue correction with respect to the first color signal by referring to the table unit. The first color signal is a device-dependent input red, green, blue color signal. The second color signal is a color signal of a hue, lightness, saturation color space. The third color signal is a color signal of CIECAM02 color space.

Moreover, according to still another aspect of the present invention, there is provided an image processing method including converting a first color signal into a second color signal and a third color signal and correcting a magnitude relation between hue angles of the third color signal such that a magnitude relation between hue angles of the second color signal corresponding to the first color signal is maintained in the hue angles of the third color signal. The first color signal is a device-dependent input red, green, blue color signal. The second color signal is a color signal of a hue, lightness, saturation color space. The third color signal is a color signal of CIECAM02 color space.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is an example for explaining an expression for conversion of RGB to HLS and vice versa.

DETAILED DESCRIPTION OF THE PREFERRED EMBODIMENTS

Exemplary embodiments of the present invention are explained in detail below with reference to the accompanying drawings.

In a first embodiment of the present invention, a magnitude relation between hue angles of blue hue is corrected.

Figure 1A:
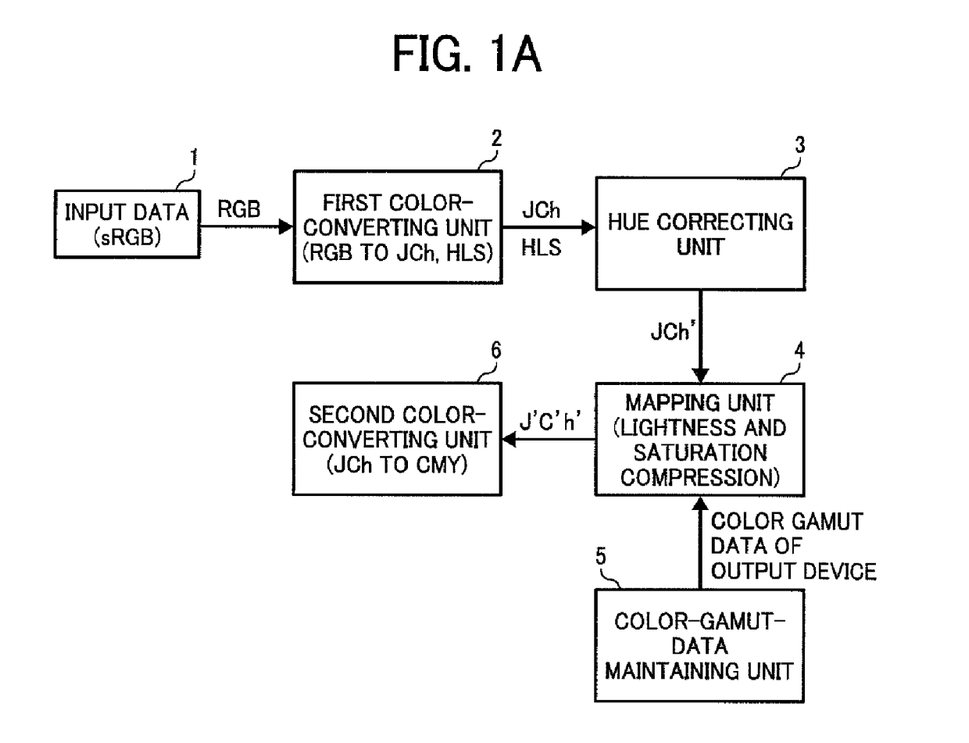
FIG. 1A is a block diagram of an image processing device according to a first embodiment of the present invention.

FIG. 1A is a block diagram of an image processing device according to the first embodiment. As shown in FIG. 1A, the image processing device includes a first color-converting unit 2, a hue correcting unit 3, a mapping unit 4, a color-gamut-data maintaining unit 5, and a second color-converting unit 6.

Figure 1B:
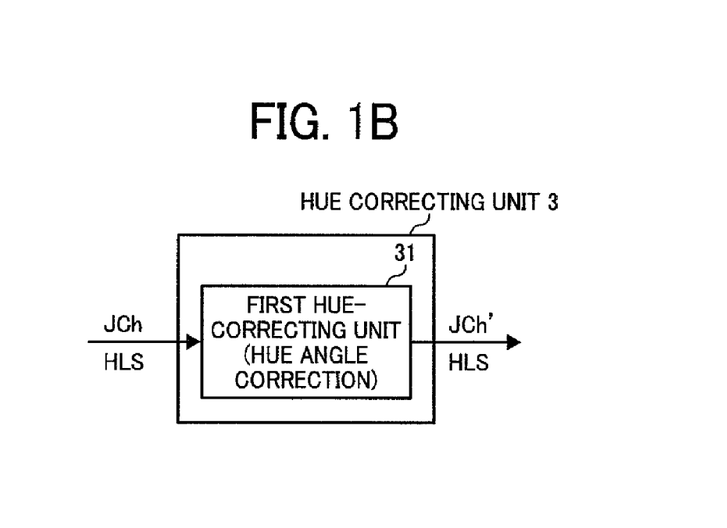
FIG. 1B is a block diagram of a hue correcting unit of the image processing device according to the first embodiment.

The first color-converting unit 2 converts input data 1 into color signals of a hue, lightness, saturation (HLS) color space that includes a hue, lightness, and saturation and color signals of a perceptual quantity color space (for example, lightness, saturation, hue (JCh) or brightness, colorfulness, hue (QMh)

of color appearance model international commission on illumination color appearance model 2002 (CIECAM02)) that performs hue correction and color gamut compression. The hue correcting unit 3 corrects with respect to the input data 1, a magnitude relation between hue angles in the perceptual quantity color space. The mapping unit 4 performs gamut compression such that an input data corrected by the hue correcting unit 3 is collected within a color gamut of an image output device. The color-gamut-data maintaining unit 5 maintains a color gamut data of the image output device that is used for gamut compression and the second color-converting unit 6 converts the input data that is mapped by the mapping unit 4 within the color gamut of the image output device into color signals for image forming of the image output device. As shown in FIG. 1B, the hue correcting unit 3 according to the first embodiment includes a first hue-correcting unit 31.

Upon receiving the input data 1, the first color-converting unit 2 converts the input data 1 into the color signals of the HLS color space and the JCh color space and transmits HLS color signals and JCh color signals to the first hue-correcting unit 31. Upon receiving the HLS color signals and the JCh color signals corresponding to the input data 1, the first hue-correcting unit 31 corrects a magnitude relation between hue angles h in the JCh color space according to hue angles H in the HLS color space and transmits data after correction to the mapping unit 4. The mapping unit 4 receives the color gamut data of the image output device from the color-gamut-data maintaining unit 5 and based on the received color gamut data, performs compression of a lightness range and saturation. The input data subjected to a hue correction process is converted such that the input data is collected within the color gamut of the image output device and is transmitted to the second color-converting unit 6. The second color-converting unit 6 converts the input data, which is converted such that the input data is collected within the color gamut of the image output device, into an image forming data of the image output device.

Figure 2:
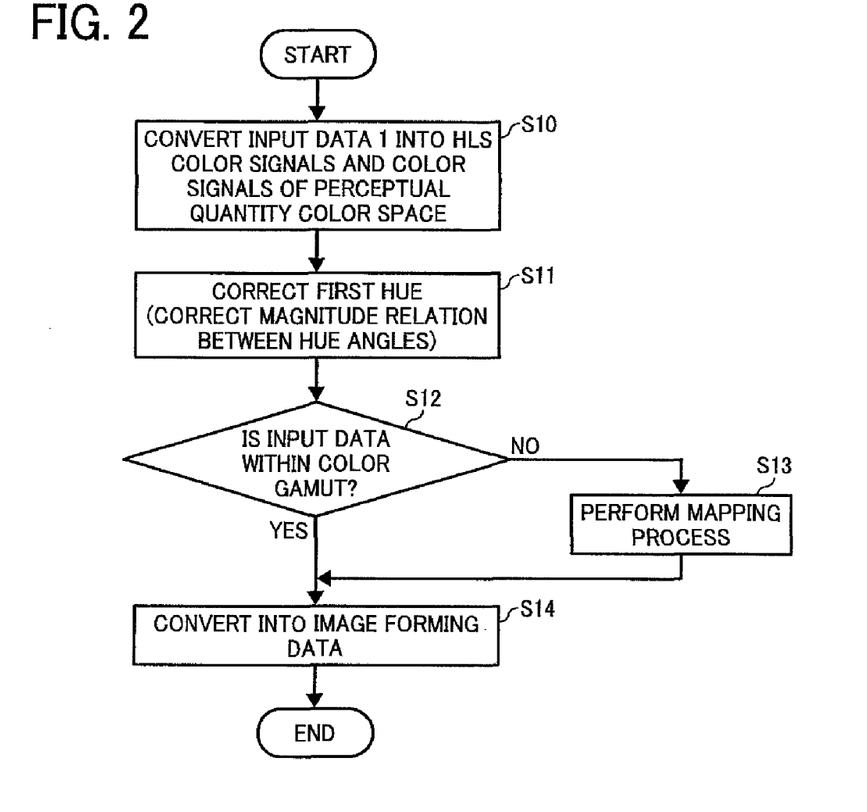
FIG. 2 is a flowchart for explaining processes according to the first embodiment.

FIG. 2 is a flowchart for explaining processes according to the first embodiment of the present invention. The first color-converting unit 2 converts the input data 1 (sRGB color signals are assumed as an example) that is input via a network interface or various recording media into the HLS color signals and the color signals of the perceptual quantity color space (the JCh color signals of the color appearance model CIECAM02 are assumed as an example) (S10).

The conversion from sRGB to HLS is carried out as indicated in expression (1). H is a hue (0 to 360 (360 is equal to 0)) signal, S is a saturation (0 to 1.0) signal, and L is a lightness (0 to 1.0) signal. Upon performing conversion from sRGB to XYZ tristimulus values based on a definition of the sRGB color space, the conversion from sRGB to JCh of CIECAM02 is carried out based on a definition of the technical report CIE 159:2004 of CIE. J indicates lightness (0 to 100), C indicates saturation, and h indicates the hue angle (0 to 360 (0 is equal to 360)). However, because HLS indicates the hue in the sRGB color space and JCh are the color signals of the perceptual quantity color space, values of H and h differ with respect to the same input data 1. Thus, the input data 1 converted into HLS and JCh is transmitted to the first hue-correcting unit 31.

If the first hue-correcting unit 31 receives the input data 1 from the first color-converting unit 2, as shown in FIG. 11, when H=225 degrees (assumed as CBB hue) and H=240 degrees (assumed as B hue), the magnitude relation between the hue angles in the HLS color space and the JCh color space becomes reverse. Thus, for returning to an original positional relation of the hue angles in the HLS color space, the process for correcting the magnitude relation between the hue angles in the JCh color space is carried out in the JCh color space (S11).

Specifically in an example explained in FIG. 11, with respect to the input data in which H is greater than or equal to 225 degrees and is less than 240 degrees, a process for rotating a point (or H1 line) on H1=225 degrees in a clockwise direction is carried out (a process in which the hue angles h in the JCh color space are uniformly changed to −5) such that h2 is greater than h1. Thus, the magnitude relation between the hue angles is corrected.

Figure 3:
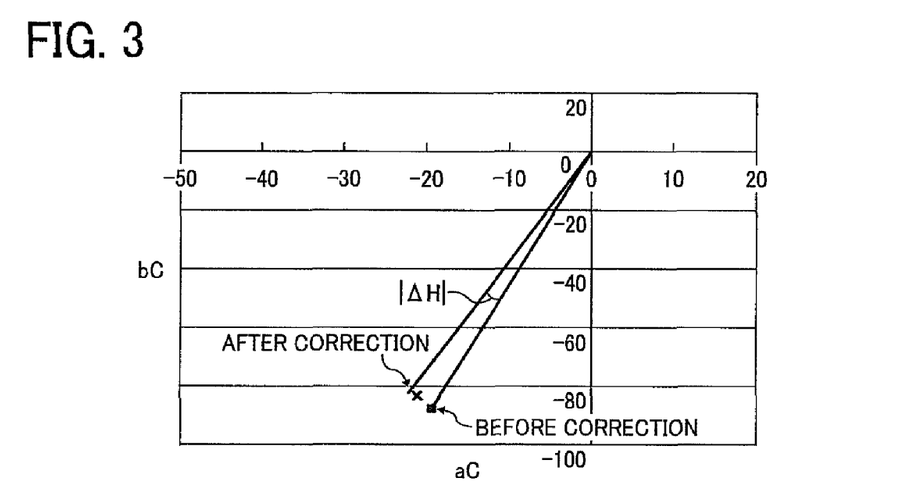
FIG. 3 is a schematic diagram for explaining correction of a magnitude relation between hue angles.

The correction of the magnitude relation, which is shown in FIG. 3, is indicated in expression (2). In expression (2), the hue angle of the input data is assumed as h_in, a correction amount of the hue angles for correcting the magnitude relation is assumed as Δh, and the hue angle after correction is assumed as h_out.

$$h\_out = h\_in + \Delta h \text{ at } 225° \leq H \leq 240° \tag{2}$$

In FIG. 3, the hue angle of H1 before correction is corrected up to an amount equivalent to Δh, thus forming H1 after correction. Due to this, the magnitude relation between the hue angles h in the CIECAM02 color space when H1=225 degrees and H2=240 degrees is corrected and the original magnitude relation between the hue angles H in the HLS color space is maintained.

Thus, the input data, which includes the corrected magnitude relation between the hue angles is transmitted to the mapping unit 4. If the mapping unit 4 receives the input data from the first hue-correcting unit 31, an expressible color gamut differs in image display devices such as a cathode ray tube (CRT) and a liquid crystal display (LCD) and the image output device such as a printer. Thus, compression of lightness and saturation is carried out such that the input data is collected in the color gamut of the image output device.

Figure 4:
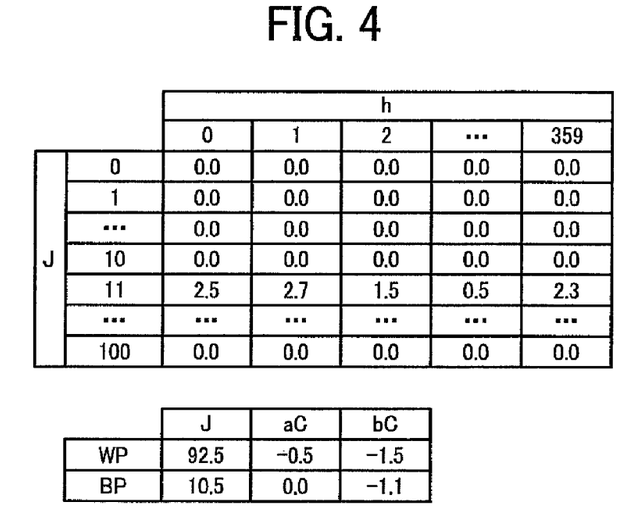
FIG. 4 is a table for explaining a color gamut data of an output device.

Although, lightness compression is carried out first, the mapping unit 4 retrieves the color gamut data of the image output device that is shown in FIG. 4 from the color-gamut-data maintaining unit 5. The color gamut data shown in FIG. 4 includes a maximum saturation data for each fixed lightness and for each fixed hue angle, a perception quantity (color signals of the $Ja_c b_c$ color space of CIECAM02) of a white point (WP) and a black point (BP).

The lightness compression is carried out as indicated in expression (3).

$$J\_out = J\_in * (WP\_J - BP\_J)/100.0 + BP\_J \tag{3}$$

In expression (3), J_in is lightness of the input data before lightness compression, J_out is lightness of the input data after lightness compression, WP_J is lightness of the white point of the image output device, and BP_J is lightness of the black point of the image output device.

Next, saturation compression is carried out with respect to the input data subjected to lightness compression. In saturation compression, by assuming the input data after lightness compression as J=11, C=5.0, and h=1.0, the maximum saturation (that is 2.7) when J=11 and h=1 is referred from a color gamut data table shown in FIG. 4 and is compared with saturation of the input data (S12). If saturation of the input data is low, input data within the color gamut of the image output device is determined and saturation compression is not carried out. If saturation of the input data is high, input data is replaced by the maximum saturation data of the color gamut data. In other words, in the example, the input data is compressed to J=11, C=2.7, and h=1.0 (S13). The compression method of lightness and saturation is not limited to the fixed compression of the hue and lightness after lightness compression. A common mapping method can be used as the compression method. Thus, the input data mapped within the color gamut of the image output device is transmitted to the second color-converting unit 6.

If the second color-converting unit 6 receives the input data subjected to hue correction and a mapping process, the input data is converted into the image forming data by using a predicting model that predicts a perceptual quantity JCh with respect to the image forming data of the image output device and an interpolation arithmetic method that uses a three dimensional lookup table (3D-LUT) (S14).

According to the first embodiment that is mentioned earlier, the magnitude relation between the hue angles in the CIECAM02 color space is corrected. Due to this, the color, which maintains the magnitude relation between original hue angles in the input data color space, can be corrected.

In a second embodiment of the present invention, a curve, of the hue in the CIECAM02 color space of an HLS equal hue line in the hue that is in the vicinity of blue, is corrected and the magnitude relation between the hue angles is corrected.

Figure 5A:
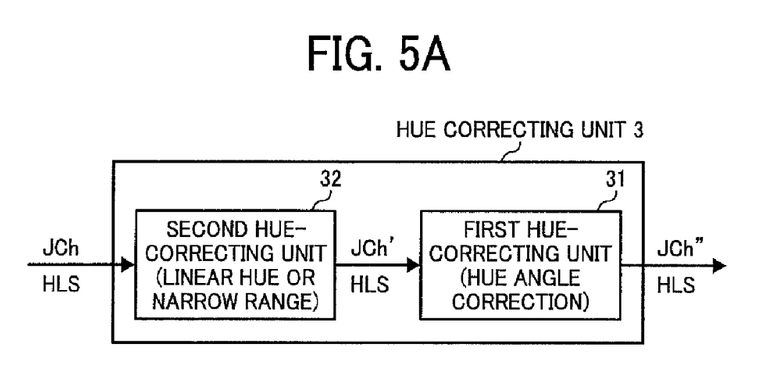
FIGS. 5A and 5B are block diagrams of a hue correcting unit of an image processing device according to a second embodiment of the present invention.
Figure 5B:
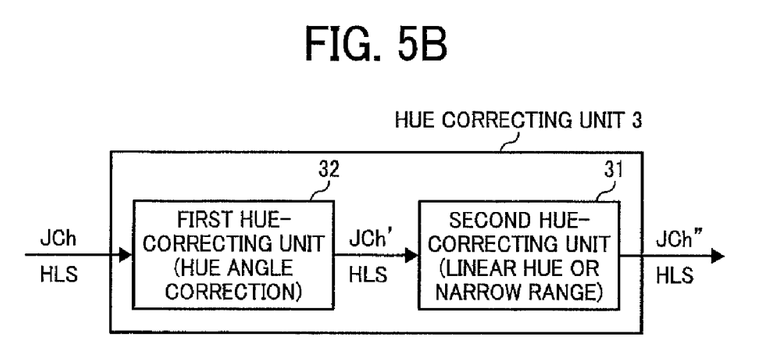

Although a structure of the second embodiment is nearly similar to the structure of the first embodiment, the structure and operations of the hue correcting unit 3 are different. FIGS. 5A and 5B are block diagrams of a hue correcting unit 3 according to the second embodiment. The hue correcting unit 3 according to the second embodiment includes the first hue-correcting unit 31 and a second hue-correcting unit 32.

Upon receiving the input data 1, the first color-converting unit 2 converts the input data 1 into the color signals of the HLS color space and the JCh color space and transmits the color signals of the HLS color space and the JCh color space to the second hue-correcting unit 32. Upon the second hue-correcting unit 32 receiving the HLS color signals and the JCh color signals corresponding to the input data 1, the hue correction is carried out such that according to the hue angles H in the HLS color space, the hue angles h in the JCh color space match (linear hue) with or approximates (narrow range) the hue angles h of the maximum saturation point in the HLS color space of the same hue angles H. Along with the HLS color signals, the JCh color signals after correction are also transmitted to the first hue-correcting unit 31. Upon the first hue-correcting unit 31 receiving the HLS color signals and the JCh color signals after correction, the magnitude relation between the hue angles h is corrected and the data after correction is transmitted to the mapping unit 4. The operations of the mapping unit 4, the color-gamut-data maintaining unit 5, and the second color-converting unit 6 are similar to the operations mentioned in the first embodiment.

The operations of each processor are explained in detail below. Similarly as in the first embodiment, the first color-converting unit 2 converts the input data 1 (for example, sRGB color signals) into the HLS color signals and the color signals (for example, JCh color signals of the color appearance model CIECAM02) of the perceptual quantity color space and transmits the input data converted into HLS and JCh to the second hue-correcting unit 32.

Figure 6:
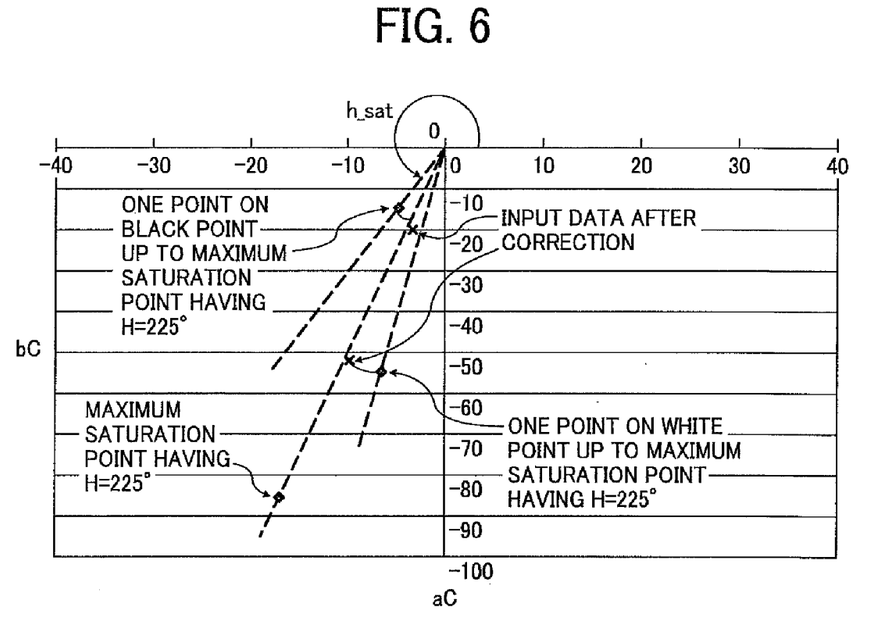
FIG. 6 is a schematic diagram for explaining operations of a second hue-correcting unit according to the second embodiment.

FIG. 6 is a schematic diagram for explaining the operations of the second hue-correcting unit 32. In FIG. 6, one point on the white point to the maximum saturation point when H=225 degrees is the input data before correction. The hue angle h of the input data before correction is h_in. The hue angle h_in of the input data before correction is processed such that the hue angle h_in approximates a hue angle h_sat that is explained later. The hue angle h_in then becomes the input data after correction (from one point to symbol x). Similarly, a one point on the black point to the maximum saturation point when H=225 degrees is the input data before correction. The hue angle h of the input data before correction is h_in. The hue angle h_in of the input data before correction is processed such that the hue angle h_in approximates the hue angle h_sat. The hue angle h_in then becomes the input data after correction (from one point to symbol x).

Upon the second hue-correcting unit 32 receiving the color signals, the input data before correction (H=225 degrees) and the hue angle h_sat in the CIECAM02 color space having the same hue (H=225 degrees) in the HLS color space and the maximum saturation point (S=1.0) is calculated. For example, when the hue angle in the HLS color space of the input data before correction is H=225 degrees, the maximum saturation point is H=225 degrees, S=1.0, and L=0.5. An HLS value is converted into an RGB value by using expression (1). The RGB value is treated as sRGB value and based on a definition of sRGB, the sRGB is converted into the XYZ tristimulus value. The XYZ tristimulus value is then converted into JCh of CIECAM02 by considering the monitoring environment of sRGB. The hue angle h of JCh is h_sat.

Thus, by using the calculated h_sat, the hue angle h (h_in) of the input data before correction is corrected as indicated in expression (4).

$$h\_in = a \times (h\_sat - h\_in) + h\_in \quad (4)$$

where a is a constant from 0 to 1.

In FIG. 6, two points (the two points that respectively fulfill the lightness, that is L is greater than zero and is less than 0.5 and L is greater than 0.5 and is less than 1.0) are corrected such that the hue angle h_sat of the maximum saturation point having a=1.0 and H=225 degrees in expression (4) matches with the hue angle h in the CIECAM02 color space of the color signals having the same hue angle H=225 degrees in the HLS color space. However, if S=0, in other words, the input data (including the white point and the black point) on the achromatic axis in the sRGB color space is common for all hues of sRGB, due to correction mentioned earlier, changing of the hue angle h for each hue is prevented. Thus, correction is not carried out.

Figure 7:
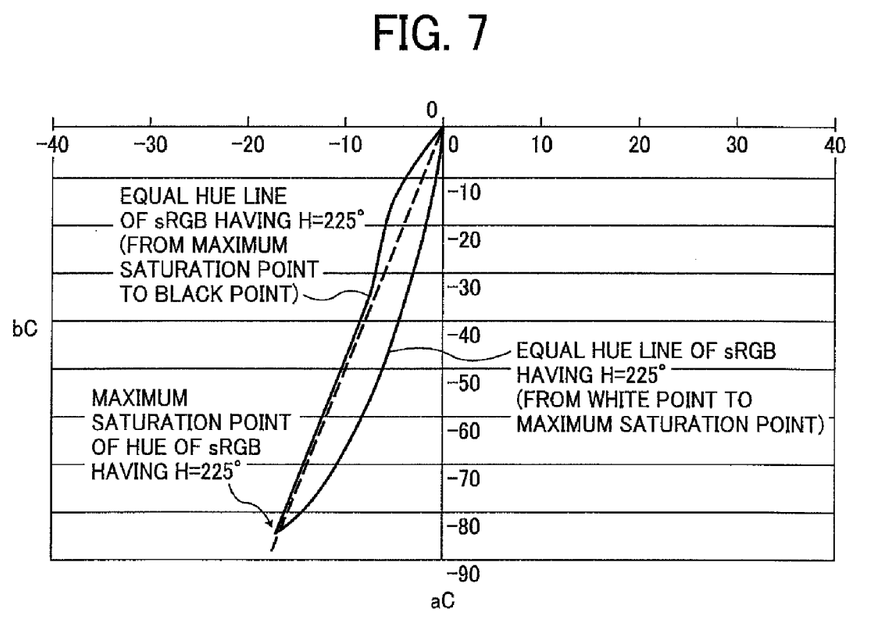
FIG. 7 is a schematic diagram for explaining a hue curve in a color space of CIECAM02 for a hue of sRGB having H=225 degrees.

FIG. 7 is a schematic diagram for explaining a equal hue line having H=225 degrees and S=1.0 in the HLS color space (when H=225 degrees and S=1.0, L is changed within a range of 0 to 1, each HLS value is converted into the RGB value. The RGB is treated as sRGB and the sRGB is converted into the JCh value of CIECAM02 and is plotted). Thus, although the hue angles are the same hue angles having H=225 degrees in the HLS color space, if mapped to the color space of CIECAM02, the equal hue line is curved from the white point up to the maximum saturation point in a direction in which the hue angle h is increased. However, from the black point up to the maximum saturation point, although the equal hue line is misaligned in a direction in which the hue angle h is decreased in a low saturation area, the equal hue line nearly matches with the hue angle h of the maximum saturation point in a high saturation area.

Thus, by applying the correction by using expression (4) only in a high lightness area than the maximum saturation point having L greater than 0.5, a calculation amount can be reduced. Furthermore, in a low lightness area, a curve of the original perceptual hue of the input data can be loyally reproduced.

Similarly as in FIG. 7, the equal hue line, of the HLS color space, having H=240 degrees is indicated on an $a_c b_c$ plane of CIECAM02 in FIG. 13. The equal hue line having H=240 degrees is significantly curved from the white point to the maximum saturation point. The curving mentioned earlier differs according to the hue angle H in the HLS color space. Thus, by correcting the magnitude relation between the hue angles in the vicinity of the maximum saturation point by the first hue-correcting unit 31, the magnitude relation between the hue angles H and h is likely to be changed at a point other than the maximum saturation point. Thus, by performing hue correction by the second hue-correcting unit 32, because only the magnitude relation between the hue angles nearly at the maximum saturation point needs to be considered, the magnitude relation between the hue angles can be easily corrected.

Thus, the color signals subjected to hue correction are transmitted to the first hue-correcting unit 31 and similarly as in the first embodiment, the magnitude relation between the hue angles is corrected. Processing by the first hue-correcting unit 31 and the second hue-correcting unit 32 can be carried out in a reverse sequence as shown in FIG. 5B.

The color signals subjected to hue correction are transmitted to the mapping unit 4 and similarly as in the first embodiment, the color signals are mapped within the color gamut of the image output device and are converted into the color signals for image forming by the second color-converting unit 6.

According to the second embodiment, the hue angle h of the input data is processed such that the hue angle h approximates the hue angle h of the maximum saturation point of the same hue angle H in the input data and the HLS color space. Thus, the magnitude relation between the hue angles can be more easily corrected. Furthermore, the color reproduction can be carried out such that the isochromatic data of the HLS color space can be perceptually appeared as more isochromatic.

In a third embodiment of the present invention, corrections are carried out by using a table. A process for hue linearzation is carried out by interpolating the table, thus marginally worsening isochromaticity. However, by applying only one hue correcting unit, the image processing device is simplified.

Figure 8:
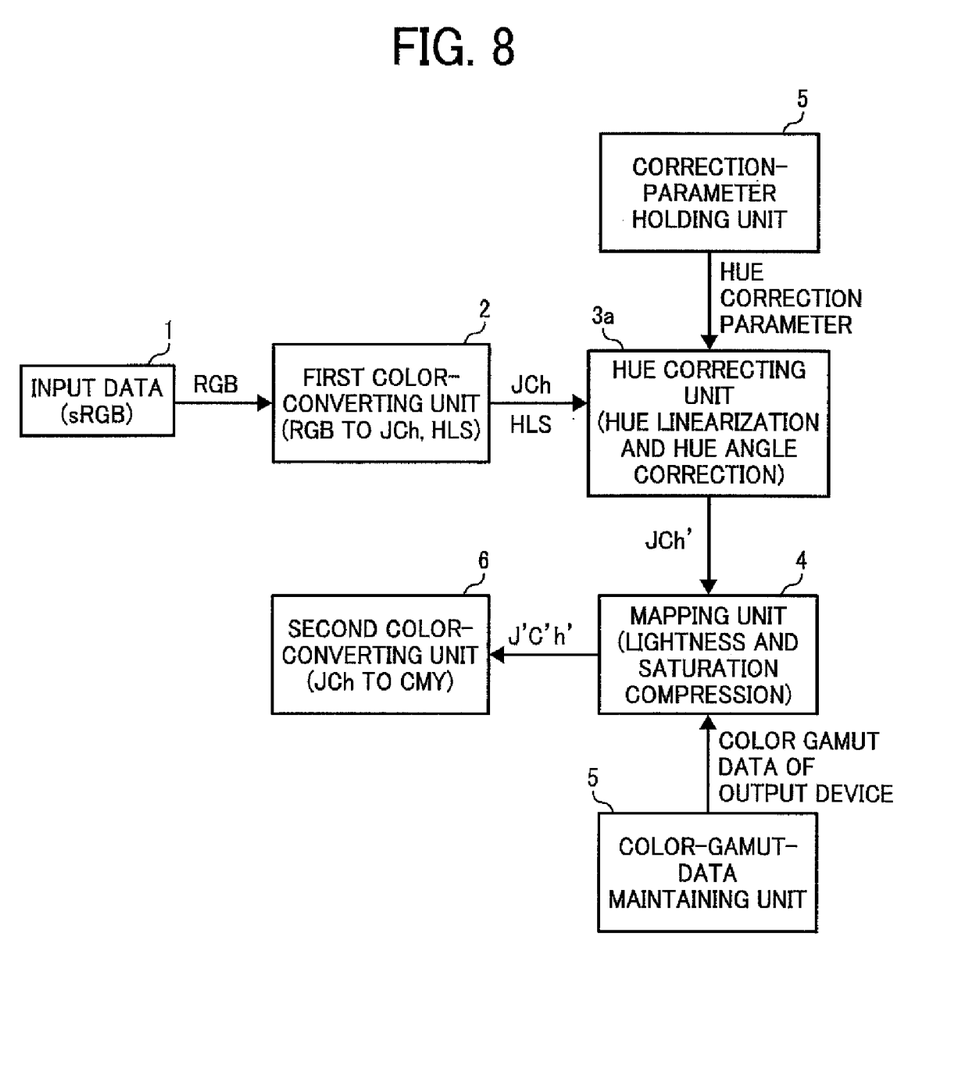
FIG. 8 is a block diagram of an image processing device according to a third embodiment of the present invention.

FIG. 8 is a block diagram of an image processing device according to the third embodiment. In the third embodiment, a correction-parameter holding unit 7 that holds a hue correction parameter is added. Thus, a process of a hue correcting unit 3a differs from the process mentioned in the second embodiment.

Similarly as in the embodiments mentioned earlier, upon inputting the input data 1, the first color-converting unit 2 converts the input data 1 into the color signals of the HLS color space and the JCh color space and transmits the color signals of the HLS color space and the JCh color space to the hue correcting unit 3a. Upon receiving the HLS color signals and the JCh color signals corresponding to the input data 1, the hue correcting unit 3a reads the hue correction parameter from the correction-parameter holding unit 7 and based on the HLS color signals of the input data and the hue correction parameter, performs hue correction with respect to the JCh color signals of the input data. The input data including the corrected hue angles h is transmitted to the mapping unit 4. Upon receiving the input data subjected to hue correction, the mapping unit 4 reads the color gamut data of the image output device from the color-gamut-data maintaining unit 5 and based on the color gamut of the image output device, performs compression of the lightness range and saturation. The mapping unit 4 converts the input data such that the input data is collected within the color gamut of the image output device. The data after compression is then transmitted to the second color-converting unit 6. Similarly as in the embodiments mentioned earlier, the second color-converting unit 6 converts the input data, which is converted such that the input data is collected within the color gamut of the image output device, into the image forming data of the image output device.

Figure 9:
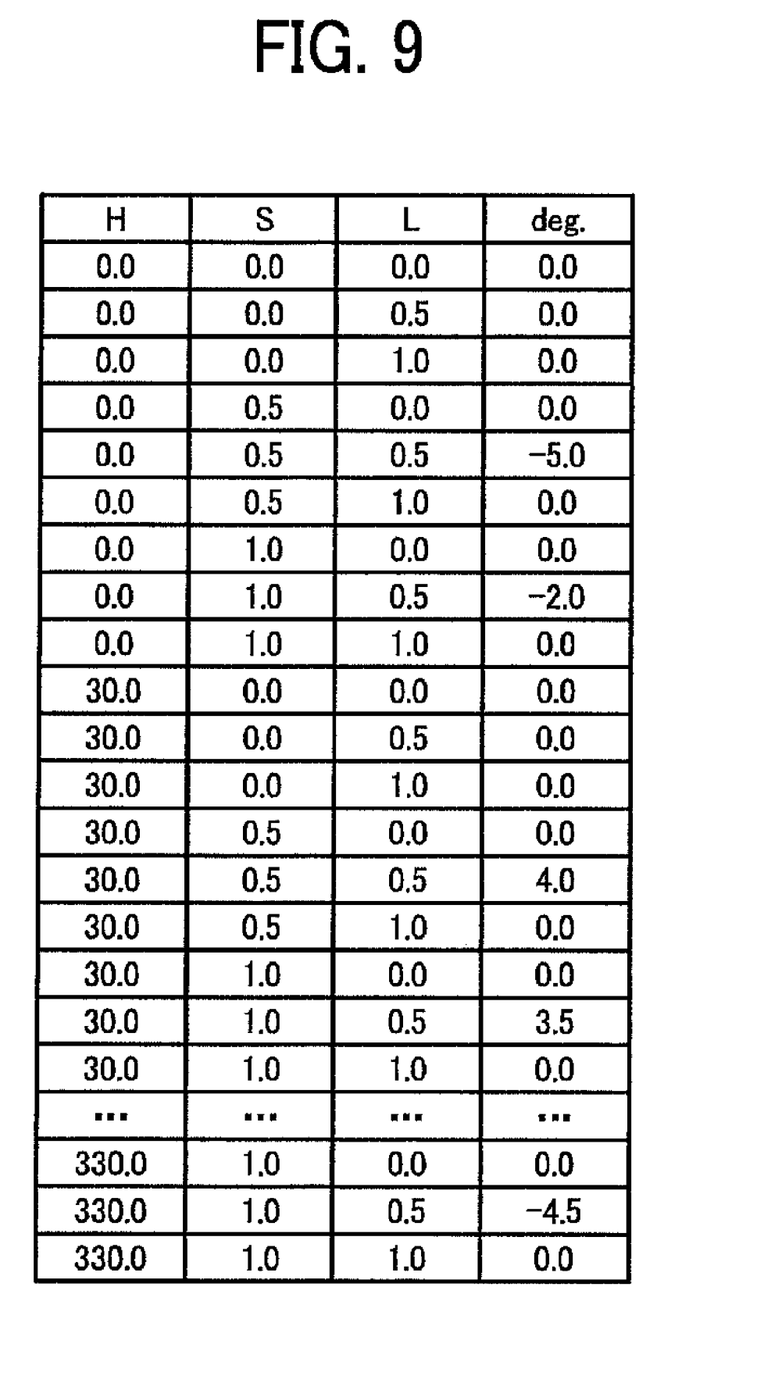
FIG. 9 is a table for explaining examples of a hue correction parameter according to the third embodiment.

The operations of the hue correcting unit 3a are explained in detail with reference to FIGS. 8 and 9. Upon receiving the HLS and JCh color signals of the input data, the hue correcting unit 3a reads the hue correction parameter from the correction-parameter holding unit 7. An example of a hue correction parameter table is indicated in FIG. 9. In the hue correction parameter table, a correction amount of the hue angles h is calculated for aligning the hue angles in the JCh color space at the maximum saturation point having S=1.0 and L=0.5 in the same hue angle for each hue angle H with respect to an HLS grid point where each component of the HLS color space is prior uniformly distributed. An amount that is obtained by adding in the correction amount of the hue angle h, the hue correction amount that is obtained by performing subjective evaluation with respect to the color signals of each HLS color space and that is used for adjusting to a desired color is maintained as the correction amount (degree). However, the correction amount of the achromatic axis having S=0 or the correction amount of the white point and the black point is zero.

The hue correction parameter table is interpolated with respect to the input data and the hue correction amount is calculated. For example, when the input data HLS color signals are H=15.0, S=0.25, L=0.25, by using eight points such as (H/L/S)=(0.0/0.0/0.0), (0.0/0.0/0.5), (0.0/0.5/0.0), (0.0/0.5/0.5), (30.0/0.0/0.0), (30.0/0.0/0.5), (30.0/0.5/0.0), (30.0/0.5/0.5) shown in FIG. 9, the hue correction parameter table is interpolated and the correction amount is calculated. The interpolation process can be carried out by considering the HLS as the orthogonal coordinate system and the interpolation process can also be carried out by considering the HLS as the cylindrical coordinate system (see Japanese Patent Application Laid-open No. H9-186905). Thus, by adding the calculated hue angle correction amount to the input data, hue correction is carried out.

The corrected input data is transmitted to the mapping unit 4 and similarly as in the embodiments mentioned earlier, the input data is converted into the image forming data.

According to the third embodiment, the curve of the hue in the color space belonging to the input data and the magnitude relation between the hue angles in the perceptual quantity color space are corrected by using a prior created single hue correction parameter. Thus, as compared to the first embodiment, accuracy in the hue curve correction is slightly deteriorated. However, the perceptual isochromaticity of the input data can be enhanced only by the simple hue correcting process, and the color, which maintains the hue relation, in the color space belonging to the input data can be converted.

A media claim is explained in a fourth embodiment of the present invention.

Figure 10:
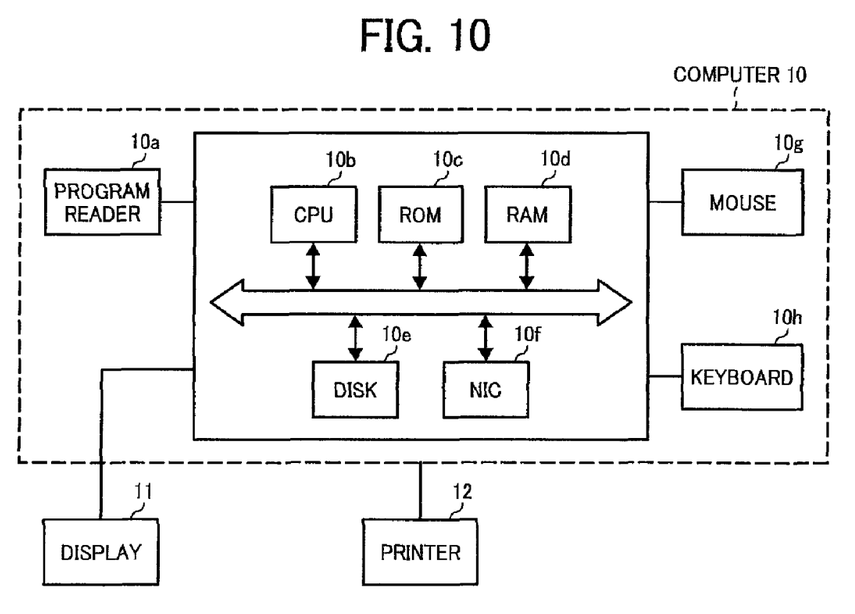
FIG. 10 is a block diagram of a hardware structure of an image processing system according to a fourth embodiment of the present invention.

FIG. 10 is a block diagram of a hardware structure of an image processing system according to the fourth embodiment. As shown in FIG. 10, a computer 10 includes a program reader 10a, a central processing unit (CPU) 10b that controls the entire computer 10, a random access memory (RAM) 10c that is used as a work area of the CPU 10b, a read only memory (ROM) 10d in which control programs of the CPU 10b are stored, a hard disk 10e, a network interface card (NIC) 10f, a mouse 10g, a keyboard 10h, a display 11 that displays an image data and that enables a user to input data by directly touching the screen, and an image forming apparatus 12 such as a color printer. The image processing system can be implemented on a workstation or a PC.

In the structure mentioned earlier, functions such as the first color-converting unit 2, the second color-converting unit 6, the hue correcting unit 3, and the mapping unit 4 can be included in the CPU 10*b*. The function such as the color-gamut-data maintaining unit 5 can be included in the RAM 10*c*, the ROM 10*d*, and the hard disk 10*e* and the data can be input from an external device by using the NIC 10*f*. Image processing functions such as hue correction and mapping can be provided in the form of data recording media such as an optical disk such as a compact disk read only memory (CD-ROM) and a magnetic disk. Thus, if the data recording medium is set in the example shown in FIG. 10, a (not shown) medium driving device is arranged for driving the data recording medium.

The image processing device and the image processing method according to the embodiments of the present invention can be implemented in a structure in which a general-purpose computer system, which includes a display, reads computer programs recorded in the data recording medium such as the CD-ROM, and a central processing unit of the general-purpose computer system performs color space conversion and hue correction. The computer programs, which are applied for executing image processing, according to the embodiments of the present invention, in other words, the computer programs used in a hardware system can be provided by recording in the recording medium. Apart from the CD-ROM, the ROM, the RAM, a flash memory, and a magneto optical disk can be used as the data recording medium for recording the computer programs. The computer programs recorded in the recording medium can be installed on a recording device such as the hard disk 10*e* that is built-in in the hardware system. Due to this, the computer programs can be executed and the function such as the color conversion can be implemented. Apart from the recording medium, the computer programs for implementing the function such as the color conversion can be provided from a server by communicating via a network.

According to one aspect of the present invention, a magnitude relation between hue angles is corrected in a color appearance model international commission on illumination color appearance model 2002 (CIECAM02) color space. Thus, a color, which maintains a magnitude relation between original hue angles, in a color space belonging to an input data can be converted.

Furthermore, according to another aspect of the present invention, hue correction is carried out such that, the hue angles in the CIECAM02 color space of the input data approximates hue angles in the CIECAM02 color space of a maximum saturation point in a color space belonging to the input data. Thus, even though an equal hue line in the color space belonging to the input data is significantly curved in a perceptual quantity color space, the hue can be easily converted such that the magnitude relation between the original hue angles in the input data is maintained and the color can be converted such that perceptual isochromaticity of an isochromatic data in the color space of the input data can be enhanced.

Moreover, according to still another aspect of the present invention, a perceptual curve of the hue in the color space belonging to the input data is corrected only on a high lightness side than the maximum saturation point. Because the perceptual curve of the hue is not corrected on a low lightness side, while correcting the curve of the hue on the high lightness side, color conversion can be carried out such that the correction process on the low lightness side can be omitted.

Furthermore, according to still another aspect of the present invention, the hue is corrected only with respect to a chromatic color without correcting the hue with respect to an achromatic color of the input data. Thus, by using a hue correction process, color change of the achromatic color can be prevented.

Moreover, according to still another aspect of the present invention, hue correction is carried out only in a hue that is in the vicinity of blue hue. Thus, for hues other than blue, color conversion that loyally reproduces the hue of the input data can be carried out.

Furthermore, according to still another aspect of the present invention, hue correction in which the perceptual curve of the hue in the input data is corrected, and correction of a magnitude relation between the hue angles in the CIECAM02 color space can be simultaneously carried out. Due to this, the correction process can be more simplified.

Moreover, according to still another aspect of the present invention, an image processing method can be implemented by using computer programs. Due to this, the image processing method can be executed on a general-purpose computer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
a converting unit that converts a first color signal into a second color signal and a third color signal; and
a first correcting unit that corrects a magnitude relation between hue angles of the third color signal such that a magnitude relation between hue angles of the second color signal corresponding to the first color signal is maintained in the hue angles of the third color signal, wherein
the first color signal is a device-dependent input red, green, blue color signal,
the second color signal is a color signal of a hue, lightness, saturation color space, and
the third color signal is a color signal of international commission on illumination color appearance model 2002 color space.

2. The image processing device according to claim 1, further comprising a second correcting unit that performs a hue correction in either one of a prior stage and a later stage of the first correcting unit, wherein
the second correcting unit performs the hue correction such that the hue angles of the third color signal corresponding to the first color signal approaches, in a same hue as the hue angles in the second color signal corresponding to the first color signal, the hue angles of the third color signal of a maximum saturation point.

3. The image processing device according to claim 2, wherein the second correcting unit performs the hue correction on a high lightness side than on a medium lightness side of the first color signal.

4. The image processing device according to claim 1, wherein the first correcting unit and the second correcting unit perform the hue correction with respect to a chromatic color excluding an achromatic color.

5. The image processing device according to claim 1, wherein the first correcting unit performs the hue correction for a hue that is in vicinity of blue.

6. The image processing device according to claim 5, wherein the hue in vicinity of blue has a hue angle of the second color signal of about H=225 degrees to 240 degrees.

7. An image processing device comprising:
a converting unit that converts a first color signal into a second color signal and a third color signal;
a table unit that stores therein a parameter for correcting a hue curve of the second color signal corresponding to the first color signal and correcting a magnitude relation between hue angles of the third color signal; and
a correcting unit that performs a hue correction with respect to the first color signal by referring to the table unit, wherein
the first color signal is a device-dependent input red, green, blue color signal,
the second color signal is a color signal of a hue, lightness, saturation color space, and
the third color signal is a color signal of international commission on illumination color appearance model 2002 color space.

8. An image processing method comprising:
converting a first color signal into a second color signal and a third color signal; and
correcting a magnitude relation between hue angles of the third color signal such that a magnitude relation between hue angles of the second color signal corresponding to the first color signal is maintained in the hue angles of the third color signal, wherein
the first color signal is a device-dependent input red, green, blue color signal,
the second color signal is a color signal of a hue, lightness, saturation color space, and
the third color signal is a color signal of international commission on illumination color appearance model 2002 color space.

* * * * *